United States Patent [19]

Nakamura et al.

[11] Patent Number: 4,747,807

[45] Date of Patent: May 31, 1988

[54] CONTROL SYSTEM FOR AN INFINITELY VARIABLE TRANSMISSION

[75] Inventors: Hiroyuki Nakamura, Higashiyamato; Yoshihiko Morimoto, Mitaka, both of Japan

[73] Assignee: Fuji Jukogyo Kabushiki Kaisha, Tokyo, Japan

[21] Appl. No.: 843,963

[22] Filed: Mar. 25, 1986

[30] Foreign Application Priority Data

Jun. 29, 1985 [JP] Japan .................. 60-143462

[51] Int. Cl.$^4$ .......................................... B60K 41/16
[52] U.S. Cl. ...................................... 474/28; 474/70; 74/864; 74/868; 74/869
[58] Field of Search ............... 474/28, 18, 69, 70; 74/864, 868, 869

[56] References Cited

U.S. PATENT DOCUMENTS

| | | | |
|---|---|---|---|
| 4,369,675 | 1/1983 | van Deursen | 474/28 |
| 4,480,504 | 11/1984 | Oguma | 74/868 |
| 4,519,790 | 5/1985 | Yamamura et al. | 474/70 |
| 4,534,243 | 8/1985 | Yokoyama et al. | 474/70 |
| 4,579,021 | 4/1986 | Yamamura et al. | 74/868 |
| 4,589,071 | 5/1986 | Yamamura et al. | 474/18 |
| 4,597,308 | 7/1986 | Tanaka et al. | 474/28 |
| 4,657,522 | 4/1987 | Miyawaki | 474/28 |
| 4,663,991 | 5/1987 | Nakamura et al. | 474/28 |

*Primary Examiner*—James A. Leppink
*Assistant Examiner*—Terry Lee Melius
*Attorney, Agent, or Firm*—Martin A. Farber

[57] ABSTRACT

A control system for an infinitely variable transmission has a transmission ratio control valve having a spool for controlling oil supplied to a cylinder of a drive pulley to change the transmission ratio. Acceleration of depression of an accelerator pedal is detected to produce an acceleration signal. By controlling the pressure of oil supplied to the transmission ratio control valve in accordance with engine operating conditions and the acceleration signal, the spool is shifted, so that the speed of changing the transmission ratio is controlled.

11 Claims, 6 Drawing Sheets

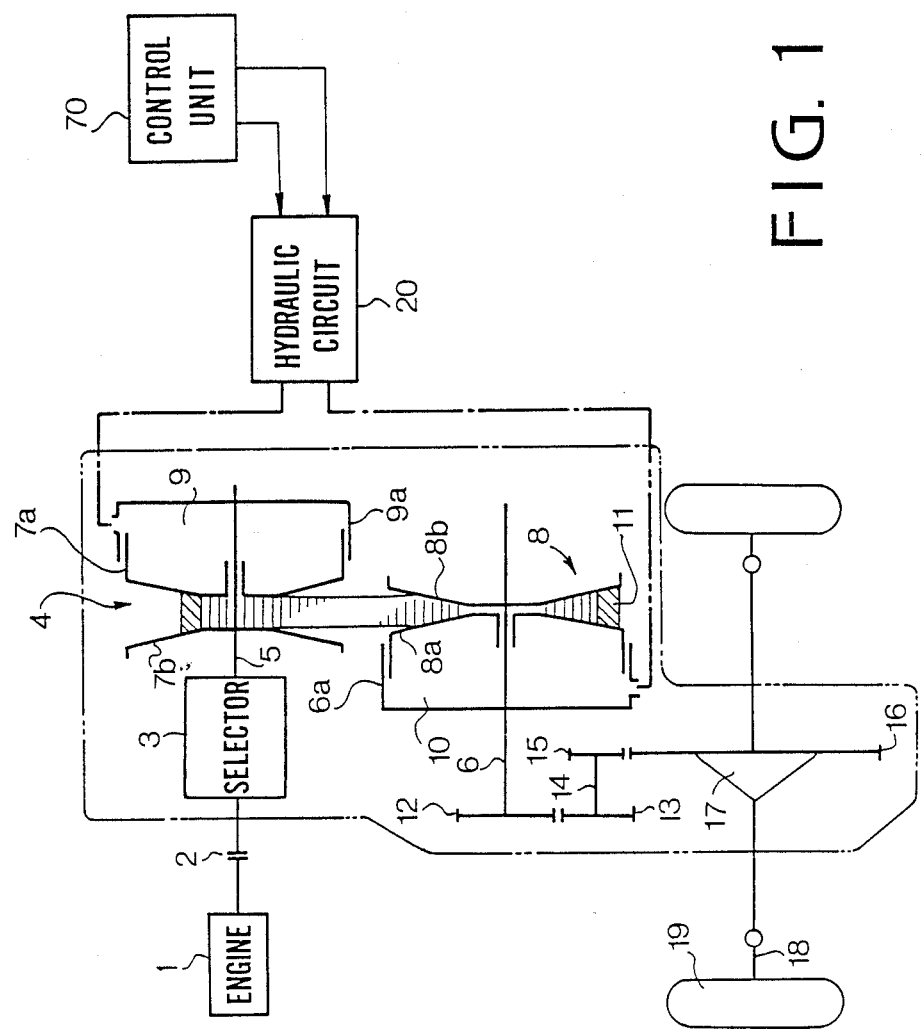

CONTROL SYSTEM FOR AN INFINITELY VARIABLE TRANSMISSION

BACKGROUND OF THE INVENTION

The present invention relates to a control system for an infinitely variable belt-drive automatic transmission for a motor vehicle, and more particularly to a system for controlling the speed of changing the transmission ratio in accordance with driving conditions of the vehicle.

A known control system for an infinitely variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of the engine is transmitted to the drive pulley through a clutch. The line pressure is controlled to prevent the belt from slipping on the pulleys in order to transmit the output of the engine.

When start of the vehicle, the transmission ratio is set at a maximum value. When the vehicle speed and engine speed reach set values under a driving condition, the transmission ratio starts to change (to upshift). At that time if the engine speed is kept constant, the transmission ratio is automatically and continuously reduced at a speed which is determined by line pressure, the pressure of oil supplied to the servo device of the drive pulley, and the actual transmission ratio. In such a system, the speed of changing of transmission ratio up to a desired transmission ratio can not be controlled in accordance with driving conditions. Accordingly, hunting or overshooting of the transmission ratio occurs, which decreases the driveability of the vehicle.

Japanese Patent Laid Open No. 59-159456 discloses a system provided with a first valve for changing the direction of the transmission ratio change and a second valve for controlling the transmission ratio changing speed. By controlling the spool of the second valve, the transmission ratio changing speed is controlled. However, the system is complicated in construction, since two control valves are provided in addition to the conventional system.

Japanese Patent Laid Open No. 59-217048 shows a system which operates to vary a desired transmission ratio in accordance with the deviation of the actual transmission ratio from the desired ratio. However, such a system causes overshooting of the control operation.

SUMMARY OF THE INVENTION

An object of the present invention is to provide a system which may control the transmission ratio changing speed by a single control valve.

Another object of the present invention is to provide a system which may correct the speed of changing of the transmission ratio in accordance with load on the engine, thereby preventing the overshooting of the control and improving the response of the control operation.

In accordance with the present invention, the transmission ratio control valve has chambers at both ends of the spool, and a solenoid operated on-off control valve is provided for controlling the amount of oil supplied to the chambers of the transmission ratio control valve. The system is provided with sensing means for sensing operating conditions of the engine and the transmission and for producing signals dependent on the conditions, an engine load detecting means for producing a load signal, a control unit responsive to the signals from the sensing means and the load signal for producing an output signal for operating the control valve, so that the shifting of the spool is controlled to control the transmission ratio changing speed.

The other objects and features of this invention will become understood from the following description with reference to the accompanying drawings.

BRIEF DESCRIPTION OF DRAWINGS

FIG. 1 is a schematic illustration of an infinitely variable belt-drive transmission;

DETAILED DESCRIPTION OF THE PREFERRED EMBODIMENT

Figure 2A:
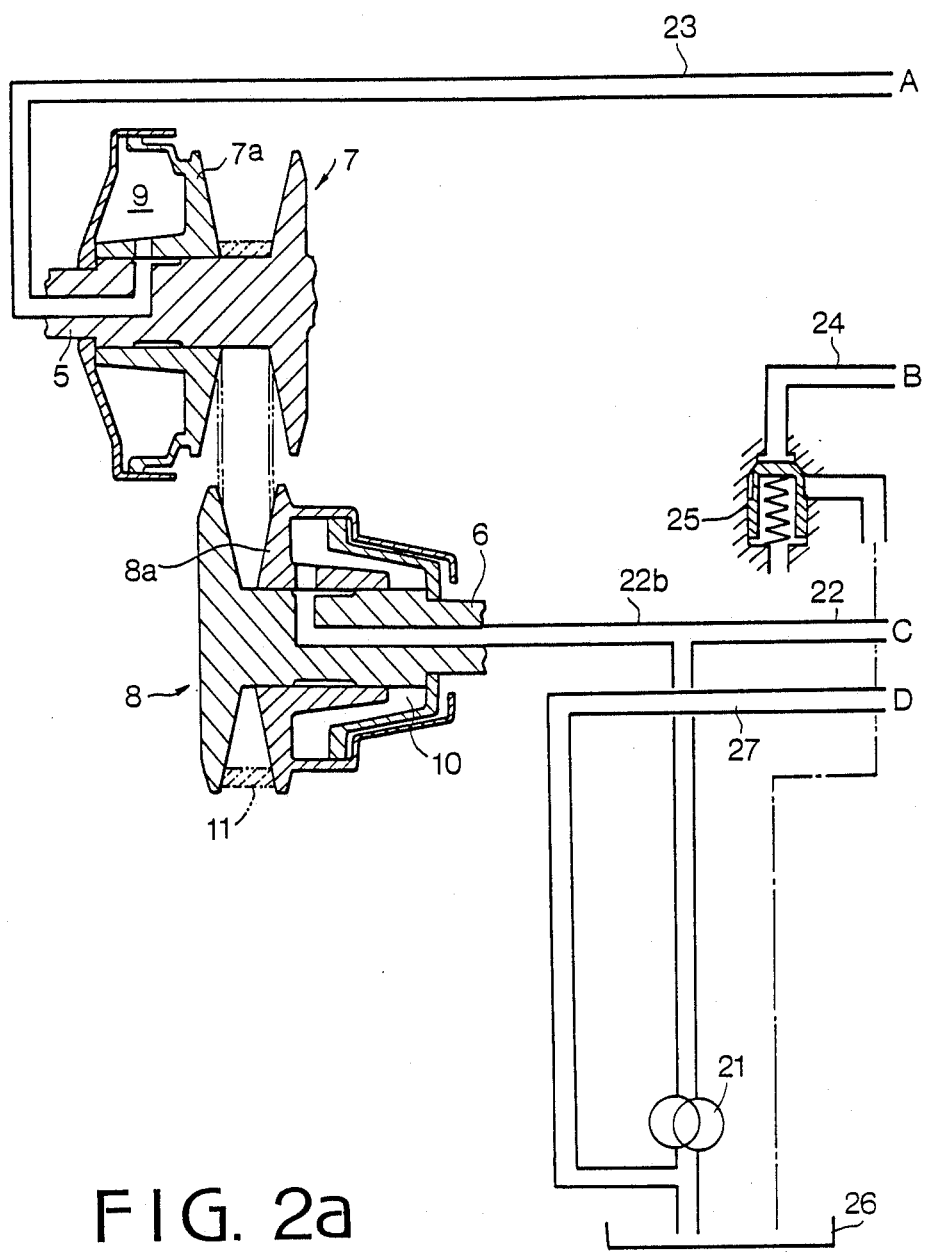
FIGS. 2a, 2b are schematic diagram showing a control system according to the present invention.

Referring to FIG. 1, an infinitely variable belt-drive automatic transmission for a motor vehicle to which the present invention is applied comprises an electromagnetic powder clutch 2 for transmitting the power of an engine 1 to a transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted the shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite the movable conical disc 8a which has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of the vehicle driving wheels 19 through a differential 17.

Figure 2B:
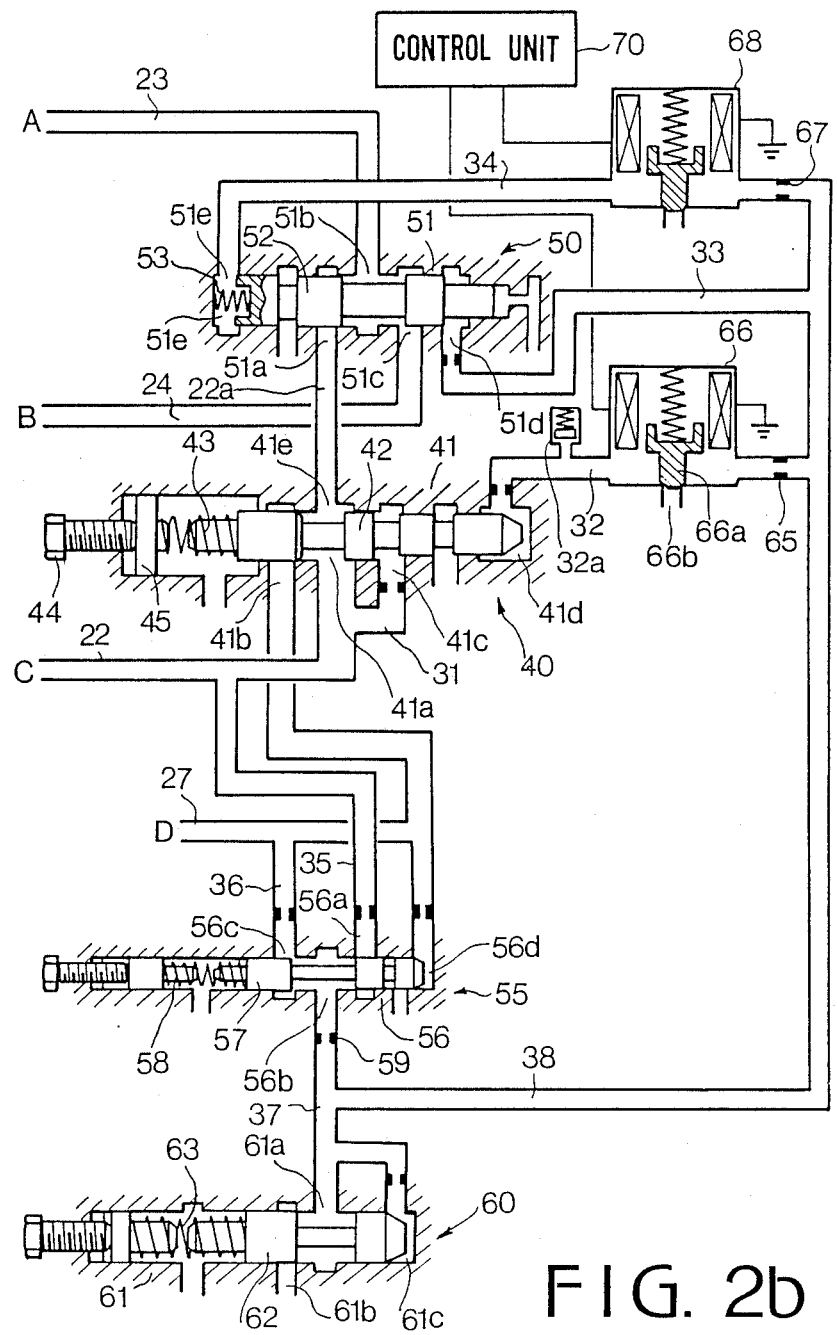

Referring to FIGS. 2a and 2b, the chamber 9 of the drive pulley 7 is applied with pressurized oil by an oil pump 21 from an oil reservoir 26 passing through a line pressure conduit 22, ports 41a and 41e of a line pressure control valve 40, a transmission ratio control valve 50, and a conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the pressure of a spring 43 provided between the end of the spool and a retainer 45, the position of which is adjustable by a screw 44. The port 41a is communicated with a port 41b of a drain passage 27 in accordance with the position of a land of the spool 42.

The transmission ratio control valve 50 comprises a valve body 51, spool 52, and a spring 53 for urging the spool in the downshift direction. A port 51b of the valve body 51 is selectively communicated with a pressure oil supply port 51a or a drain port 51c in accordance with the position of lands of the spool 52. The port 51b communicates with the chamber 9 through a conduit 23, and the port 51a communicates with the line pressure control valve 40 through conduit 22a. The drain port 51c is communicated with the oil reservoir 26 through a check valve 25. The drain port 41b communicates with the oil reservoir 26 through the conduit 27.

The system of the present invention is provided with a regulator supply valve 55, regulator valve 60, and solenoid operated on-off control valves 66 and 68. The regulator supply valve 55 comprises a valve body 56, spool 57, spring 58 for urging the spool in a direction, port 56a connected to line pressure conduit 22 through passage 35, port 56c connected to the drain passage 27 through a passage 36, and an end chamber 56d which is communicated with the drain passage 27 to be applied with the drain oil pressure opposite the spring 58. When the line pressure is at a high level, the pressure of the drain oil is at a low level because of closing the port 41b of the line pressure control valve 40. In such a state, spool 57 is shifted to the right to communicate port 56a with an output port 56b. On the other hand, when the pressure of the drain oil becomes higher than a set value, the spool 57 is shifted to the left, causing port 56c to communicate with port 56b. Thus, a sufficient amount of oil is supplied to the regulator valve 60 through an orifice 59 and passage 37.

The regulator valve 60 comprises a valve body 61, spool 62, and a end chamber 61c, spring 63 urging the spool 62 to the chamber 61c. When the pressure of supplied oil becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated valve 66 is adapted to be operated by pulses. When energized, a valve 66a opens a drain port 66b. The pulsation of the pressure of oil in the passage 32 is smoothed by orifice 65. The solenoid operated valve 68 is the same as valve 66 in construction and operation. The control valves 66 and 68 are operated by signals from a control unit 70. Thus, pressure controlled by the control valves 66 and 68 is applied to the chambers 41d and 51e.

In the line pressure control valve 40, the relationship between spring load $F_S$ and line pressure P1, line pressure receiving area $S_a$ of the spool, control pressure $P_d$ in the chamber 41d, and control pressure receiving area $S_d$ is as follows:

$$F_s = P1 S_a + P_d S_d$$

$$P1 = (F_s - P_d S_d)/S_a$$

Accordingly, the line pressure P1 is inverse proportion to the control pressure $P_d$.

In the transmission ratio control valve 50, the pressure receiving area of the spool 52 at chamber 51e is set to a value larger than the area at the chamber 51d. On the other hand, the control pressure in the chamber 51e can be changed between a maximum value which is the same as the constant pressure in the chamber 51d, when the duty ratio is 0%, and zero by controlling the duty ratio of the pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber 51e. Further, the speed of the movement of the spool increases with decreasing duty ratio. The spool 52 is shifted to an oil drain position by decreasing the duty ratio. It will be understood that when the oil is supplied to the chamber 9, the transmission is upshifted.

The relationship between the duty ratio of the pulses applied to the solenoid operated control valve 68 and the transmission ratio is explained hereinafter.

The necessary volume V of oil in the chamber 9 is a function of the transmission ratio i, namely:

$$V = f(i)$$

The flow rate Q is obtained by differentiating the volume V with respect to time and expressed as $$Q = dV/dt = df(i)/di \times di/dt$$

$$di/dt = f(Q, i)$$

The supply flow rate $Q_s$ and drain flow rate $Q_d$ are presented $$Q_d = C \cdot S_d((2g\,P_p)/\gamma)/2$$
$$= a \cdot S_d(P_p)/2$$
$$Q_s = a \cdot S_s(Pl - P_p)/2$$
$$a = c(2g/\gamma)/2$$

where
$P_p$ is the pressure in chamber 9,
P1 is the line pressure,
C is the coefficient for the flow rate, g is the acceleration of gravity,
γ is the specific gravity of oil,
$S_s$ is the opening area of the supply port 51a, and
$S_d$ is the opening area of the drain port 51c.

The duty ratio D of the pulses applied to the control valve, that is the ratio of ON/OFF of the valve, the average flow rate Q in one cycle (oil supply state is positive) is $$Q = a(D \cdot S_s(P1-P_p)/2 - (1-D) \times S_d(P_p)/2)$$

Assuming a, $S_s$ and $S_d$ to be constants, $$Q = f(D \cdot P1 \cdot P_p)$$

The line pressure P1 is determined by the transmission ratio i and engine torque, and the pressure $P_p$ in the chamber 9 is determined by the transmission ratio i and the line pressure P1. Accordingly, assuming the engine torque to be constant, $$Q = f(D,i)$$
Since $di/dt = f(Q,i)$
$$di/dt = f(D,i)$$
$$D = f(di/dt,i)$$

Accordingly, the duty ratio is determined by the transmission ratio changing speed di/dt and the transmission ratio i. On the other hand, the transmission ratio changing speed di/dt is dependent on the difference between the actual transmission ratio i and a desired transmission ratio id, $$di/dt = K(id-i),$$

where K is a coefficient

Accordingly, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51e so as to upshift the transmission. The downshift is performed in the reverse manner.

Figure 5:
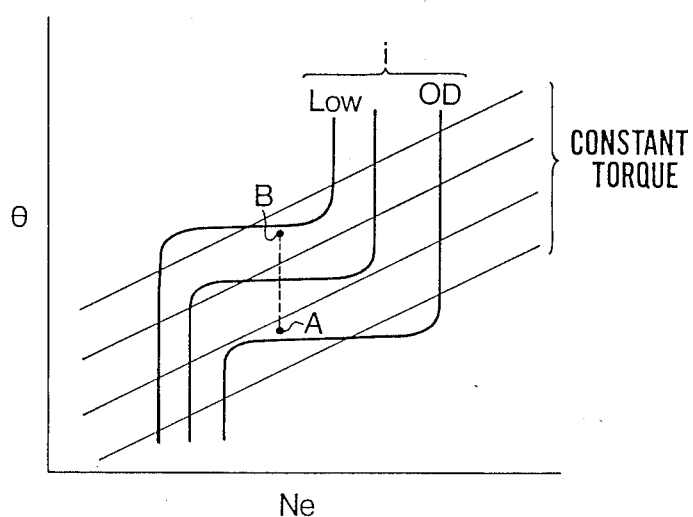
FIG. 5 is a graph showing the relationship between changes of transmission ratio and torque.

FIG. 5 shows constant torque lines and three typical transmission ratio lines, wherein LOW designates a maximum transmission ratio (low speed) and OD shows an overdrive transmission ratio line. When an accelerator pedal is depressed and throttle valve opening degree θ increases during driving of the motor vehicle at a transmission ratio at a point A, a desired transmission ratio is set, for example, to a ratio at a point B. Up to the desired ratio, torque of the engine is increased. The increase rate ΔTe of the torque is proportional to the difference (id−i). The coefficient K is function of ΔTe. The rate ΔTe is proportional to the changing rate $\dot{\theta}$ of opening degree θ of the throttle valve. Accordingly, the coefficient K should be corrected by the rate $\dot{\theta}$ or in accordance with the change of engine load.

Figure 3:
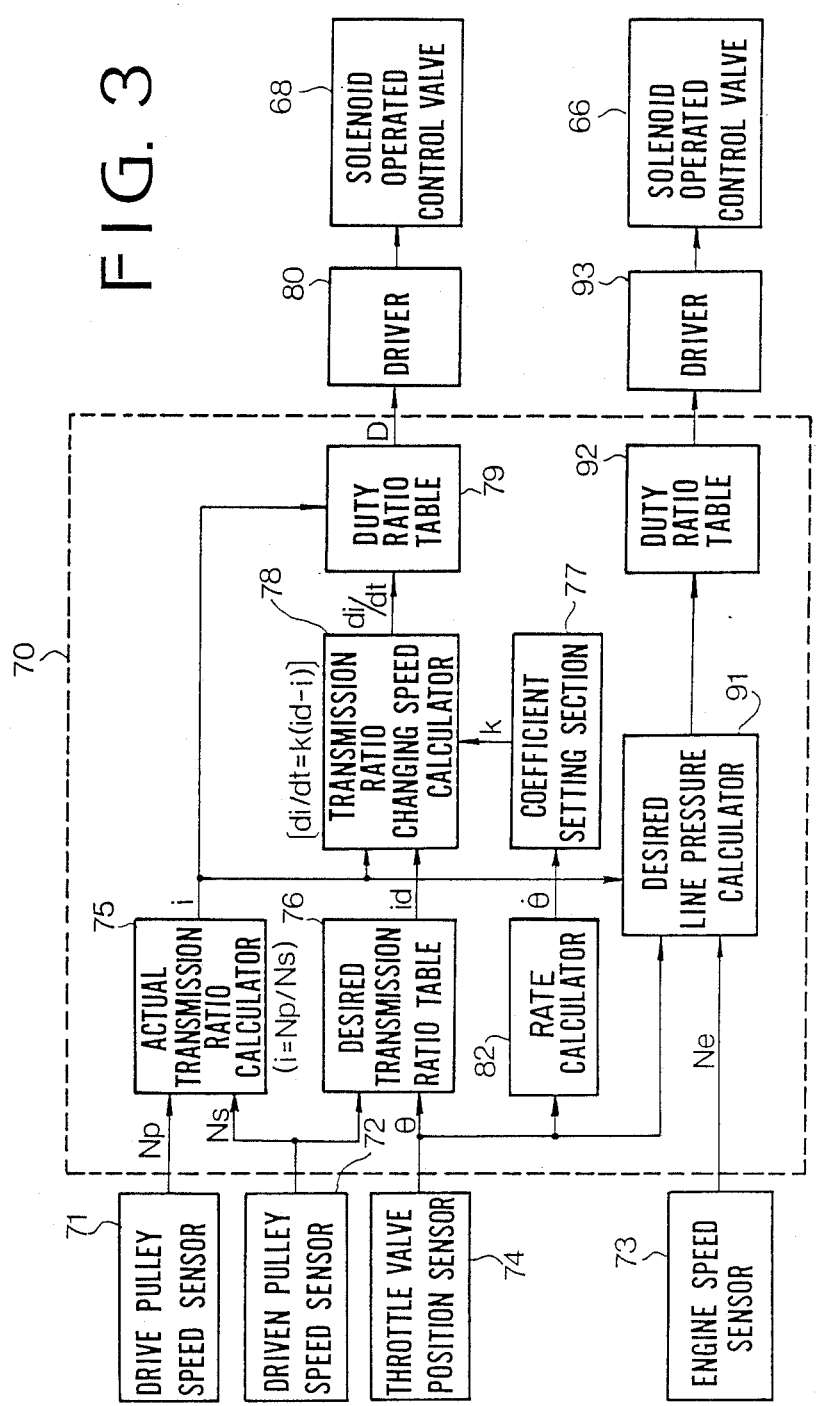
FIG. 3 is a block diagram showing a control unit.
Figure 4A:
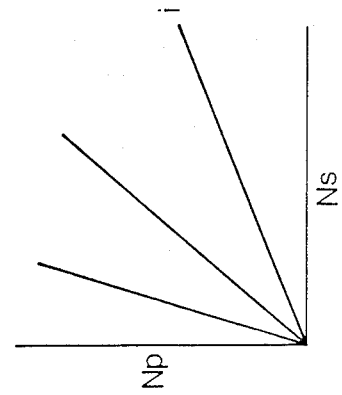
FIG. 4a shows various transmission ratios.
Figure 4B:
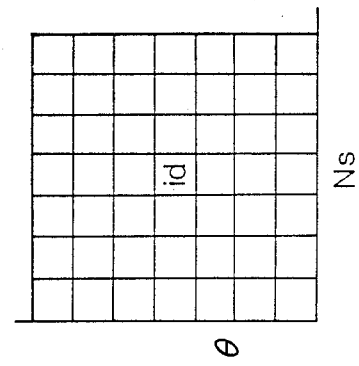
FIGS. 4b and 4c are tables storing the desired transmission ratio (id) and duty ratio (D)

Referring to FIG. 3, the system is arranged to control the transmission ratio in accordance with above-described principle. In the system, a drive pulley speed sensor 71, driven pulley speed sensor 72, engine speed sensor 73 and throttle valve position sensor 74 are provided. Output signals $N_p$ and $N_s$ are fed to an actual transmission ratio calculator 75 to produce an actual transmission ratio i in accordance with $i = N_p/N_s$. Output signals $N_s$ and θ of the throttle valve position sensor 74 are fed to a desired transmission ratio table 76. FIG. 4a shows various actual transmission ratios i and FIG. 4b shows the table 76. The desired transmission ratio id is fetched from the table in accordance with the signals $N_s$ and θ. On the other hand, the output θ is fed to a rate calculator 82 to obtain the rate $\dot{\theta}$. The signal of the rate $\dot{\theta}$ is supplied to a coefficient setting section 77 so as to correct the coefficient to produce a corrected coefficient K. The actual ratio i, desired ratio id and coefficient K from the coefficient setting section 77 are applied to a transmission ratio changing speed calculator 78 to produce a transmission ratio changing speed di/dt from the formula $di/dt = K(id-i)$.

Figure 4C:
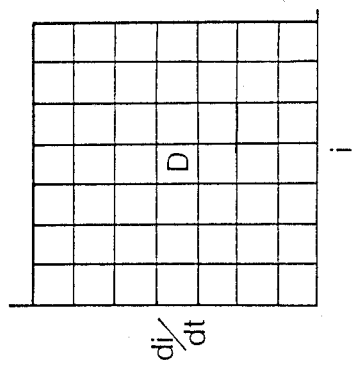

The speed di/dt and actual ratio i are applied to a duty ratio table 79 to derive the duty ratio D. FIG. 4c shows the duty ratio table in which the duty ratio decreases with increase in the speed di/dt and ratio i. The duty ratio D is supplied to the solenoid operated valve 68 through a driver 80.

On the other hand, an output signal Ne of the engine speed sensor 73, throttle position signal θ and actual ratio i are fed to a desired line pressure calculator 91 to produce the desired line pressure P1. The desired line pressure P1 is applied to a duty ratio table 92 to derive a duty ratio dependent on the desired line pressure. The duty ratio is applied to the solenoid operated valve 66 through a driver 93. The duty ratio is set to increase with an increase of the line pressure.

In operation, while the vehicle is at a stop, the chamber 10 of the driven pulley is supplied with line pressure through conduit 22b, and the chamber 9 of the drive pulley is drained, since $N_p$, $N_s$, θ and the duty ratio are zero, so that the spool 52 is at the right end position and the drain port 51c communicates with the chamber 9 through the conduit 23 as shown in FIGS. 2a and 2b. Thus, in the pulley and belt device of the infinitely variable belt-drive transmission, the driving belt 11 engages with the driven pulley 8 at a maximum running diameter to provide the largest transmission ratio (low speed stage). When the accelerator pedal is depressed, the electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started.

At that time the line pressure is at the highest value by the pressure control valve 40, since the duty ratio for the valve 66 is large, and the spool 42 of the control valve 40 is at the right end position. When the throttle valve is opened for acceleration, the desired transmission ratio id and the transmission ratio changing speed di/dt are calculated by calculators 76, 78, and the duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with the port 51b, so that oil is supplied to the chamber 9 through the conduit 23. On the other hand, the duty ratio for the control valve 66 is reduced, thereby shifting the spool 42 of the valve 40 to the left. The port 41a communicates with the port 41b of the drain passage 27. Thus, the line pressure reduces, and the transmission is upshifted, since oil is still supplied to the chamber 9 through the control valve 50. As the difference between the desired ratio id and the actual ratio i becomes large, the duty ratio for the control valve 68 becomes large, thereby increasing the transmission changing speed di/dt. When the opening degree of the throttle valve is reduced for deceleration, the duty ratio is reduced, thereby shifting the spool 52 to the right to drain the chamber 9. Thus, the transmission is downshifted. The transmission ratio changing speed at downshifting increases with reduction of the duty ratio.

When the vehicle is accelerated at steady state, acceleration $\dot{\theta}$ increases to increase the coefficient K. Accordingly, the transmission is quickly downshifted, thereby promoting the acceleration.

In accordance with the present invention, since a single transmission ratio control valve is operated to control the transmission ratio changing speed, the construction and operation are simplified.

Since the transmission ratio changing speed is controlled in accordance with load and rate change of load on the engine, response of the control operation at acceleration is improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for an infinitely variable transmission for transmitting power of an internal combustion engine, the transmission comprising a drive pulley having a hydraulically shiftable disc and the system including a hydraulic cylinder for shifting the disc, the transmission comprising a driven pulley having a hydraulically shiftable disc and the system including a hydraulic cylinder for shifting the disc of the driven pulley, the transmission comprising a belt engaged with both pulleys, the system including a first hydraulic circuit having a pump for supplying oil to both of the hydraulic cylinders, and a transmission ratio control valve having a shiftable spool for controlling the oil supplied to the cylinder of the drive pulley to change the transmission ratio, the improvement in the system wherein:

the transmission ratio control valve having chambers at both ends of the spool respectively;
   a second hydraulic circuit for supplying oil therein to the chambers;
   control valve means provided in the second hydraulic circuit for controlling flow rate of the oil supplied to at least one of the chambers of the transmission ratio control valve for shifting the spool;
   sensing means for sensing load on the engine and conditions of the transmission and for producing operating condition signals dependent on the load and conditions;
   means for detecting rate of change of the load on the engine and for producing a load changing rate signal; and
   means comprising a control unit responsive to the operating condition signals from the sensing means and to the load changing rate signal for producing an output signal for controlling operation of the control valve means so that shifting speed of the spool is variably controlled by the control valve means to variably control the transmission ratio changing speed.

2. The control sytem according to claim 1 wherein the control valve means is a solenoid operated on-off valve, and the output signal of the control unit is pulses, the duty ratio of which is changed by said control unit by said operating condition and changing rate signals so as to control the transmission ratio changing speed.

3. The control system according to claim 1 wherein the second hydraulic circuit is provided with a regulator valve for maintaining the pressure of the oil in the second hydraulic circuit at a constant value.

4. The control system according to claim 1 further comprising
   constant pressure means in said second hydraulic circuit for providing said oil therein with a constant pressure, and
   said control valve means provided in said second hydraulic circuit controls the flow rate of the oil with said constant pressure supplied to only one of said chambers.

5. The control system according to claim 1 wherein said second hydraulic circuit communicates said oil therein with said constant pressure directly to the other of said chambers.

6. The control system according to claim 5 wherein said constant pressure means directly communicates with said pump.

7. The control system according to claim 5 wherein said constant pressure means comprises a regulator supply valve communicating directly with said pump and a pressure regulator valve communicating with the regulator supply valve, and the pressure regulator valve communicating with said chambers.

8. The control system according to claim 1, wherein the transmission ratio changing speed is $$K(id-i),$$

where id is desired transmission ratio, i is actual transmission ratio, and K is a coefficient which is a function of the rate of change of the load.

9. The control system according to claim 8, wherein said means for detecting rate of change of the load forms the time derivative of the load sensed by said sensing means.

10. The control system according to claim 8, wherein said control unit comprises a coefficient setting section for generating said coefficient in response to said load changing rate signal.

11. The control system according to claim 8, wherein said control unit comprises actual and desired transmission ratio means for producing said actual and desired transmission ratios in response to said operating condition signals, and
a transmission ratio changing speed calculation means for producing said transmission ratio changing speed from said actual and desired transmission ratios and said coefficient.

* * * * *